(12) United States Patent
Suzuki

(10) Patent No.: US 10,978,732 B2
(45) Date of Patent: Apr. 13, 2021

(54) BATTERY MANUFACTURING METHOD AND BATTERY

(71) Applicant: TOYOTA JIDOSHA KABUSHIKI KAISHA, Toyota (JP)

(72) Inventor: Yuzo Suzuki, Kariya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 38 days.

(21) Appl. No.: 16/376,040

(22) Filed: Apr. 5, 2019

(65) Prior Publication Data
US 2019/0319296 A1   Oct. 17, 2019

(30) Foreign Application Priority Data

Apr. 12, 2018 (JP) .............................. JP2018-077131
Feb. 18, 2019 (JP) .............................. JP2019-026832

(51) Int. Cl.
*H01M 10/04* (2006.01)

(52) U.S. Cl.
CPC ................................ *H01M 10/049* (2013.01)

(58) Field of Classification Search
CPC .......... H01M 10/049; H01M 10/0404; H01M 2/266; H01M 10/04; H01M 10/0585; H01M 10/0525; H01M 10/28; H01M 10/30
See application file for complete search history.

(56) References Cited

U.S. PATENT DOCUMENTS

2012/0202105 A1* 8/2012 Shinyashiki .......... H01M 2/266
429/153

FOREIGN PATENT DOCUMENTS

JP   2015-163546 A   9/2015
JP   2017-191705 A   10/2017

* cited by examiner

*Primary Examiner* — Cynthia K Walls
(74) *Attorney, Agent, or Firm* — Sughrue Mion, PLLC

(57) ABSTRACT

An integrated plate is configured with a positive electrode plate, a negative electrode plate, and a separator integrated in a card-like shape. The integrated plate comprising a storage part, a positive current collecting part, and a negative current collecting part is formed in an integrated plate manufacturing process. An electrode laminated body is manufactured in a piling process by piling a plurality of the integrated plates such that the storage parts, the positive and negative current collecting parts are overlapped together seen from upper position respectively The integrated plate manufacturing process includes a raising step of forming a raised part raised from other parts by partly bending or curving in at least a coinciding one of the positive current collecting part and the negative current collecting part for the plurality of the integrated plates, and the raised parts are overlapped one another seen from upper position in the piling process.

4 Claims, 15 Drawing Sheets

BATTERY MANUFACTURING METHOD AND BATTERY

CROSS-REFERENCE TO RELATED APPLICATIONS

This application is based upon and claims the benefit of priority from the prior Japanese Patent Applications No. 2018-077131 filed on Apr. 12, 2018 and No. 2019-026832 filed on Feb. 18, 2019, the entire contents of which are incorporated herein by reference.

BACKGROUND

Technical Field

The present disclosure relates to a battery including an electrode laminated body formed by laminating or piling positive electrode plates, negative electrode plates, and separators and a manufacturing method thereof. To be more specific, the present disclosure relates to a battery configured by piling positive electrode plates, negative electrode plates, and separators which are in card-like shapes and a manufacturing method thereof.

Related Art

In batteries, some electrode laminated bodies are a wound-type in which strip-shaped electrode plates and others are wound and overlapped, and some are a laminated-type in which card-like electrode plates and others are flat piled. One prior technique related to a laminated-type electrode laminated body has been described in Patent Document 1. According to the technique, when electrode plates are to be piled on a setting part, the setting part is placed obliquely and vibrated in an appropriate manner (claim 1 and others of the Patent Document 1). The setting part is vibrated for aligning the electrode plates. In a laminated electrode body of a laminated-type, the respective electrode plates are separated from one another, and thus the alignment is essential.

RELATED ART DOCUMENTS

Patent Documents

Patent Document 1: JP2015-163546 A

SUMMARY

Technical Problems

However, the above-mentioned prior technique has the following problem. Sometimes, the alignment fails. According to the above-mentioned technique of the Patent Document 1, alignment is performed by bringing end portions of electrode plates into contact with a wall "36" on a piling table "33" in FIG. 3 of the document. However, the end portions of the electrode plates are fragile. This is because the respective end portions and their vicinity only include the current collecting foil but no electrode active material layers while an electrode plate is generally formed by applying electrode active material layers on both faces of a current collecting foil. Accordingly, in alignment, the respective end portions and their vicinity may be creased and deformed by the load applied by the contact of the end portions and their vicinity with the wall "36". This results in failure in alignment, and such failure easily occurs in the prior technique.

The present disclosure has been made to solve the problem of the above-mentioned prior technique. Specifically, a battery in which electrode plates are assuredly well-positioned in an electrode laminated body and a manufacturing method thereof are provided.

Means of Solving the Problems

A battery manufacturing method according to one aspect of the present disclosure is a manufacturing method of a battery comprising an electrode laminated body encased in an outer casing, the electrode laminated body being formed by piling a positive electrode plate, a negative electrode plate, and a separator, including an integrated plate manufacturing process of manufacturing an integrated plate configured with the positive electrode plate, the negative electrode plate, and the separator which are integrated in a card-like shape, the integrated plate comprising a storage part including the positive electrode plate, the negative electrode plate, and the separator, a positive current collecting part including the positive electrode plate only, and a negative current collecting part including the negative electrode plate only, and a piling process of manufacturing the electrode laminated body by piling a plurality of the integrated plates such that the storage parts, the positive current collecting parts, and the negative current collecting parts are overlapped together seen from upper position respectively, wherein the integrated plate manufacturing process includes a raising step of forming a raised part raised from the other part by partly bending or curving in at least a coinciding one of the positive current collecting part and the negative current collecting part for the integrated plate, and a plurality of the raised parts are overlapped one another seen from upper position in the piling process.

In the battery manufacturing method according to the above aspect, the raised part is formed in at least any coinciding one of the positive current collecting part and the negative current collecting part in the raising step of the integrated plate manufacturing process. The integrated plate used in the piling process has such the raised part. The one of the positive current collecting part and the negative current collecting part formed with the raised part has thus higher rigidity than a current collecting part in flat shape. Accordingly, the integrated plates can be aligned with high accuracy in the electrode laminated body. A battery in which the electrode plates are assuredly aligned in the electrode laminated body can be therefore obtained.

In the above battery manufacturing method, preferably, the method includes a terminal connection process of connecting a terminal connection member for connecting an external terminal to an overlapped portion of the raised parts after the piling step. This configuration can provide a connection structure of the electrode laminated body and the external terminal. The raised part used for improving alignment accuracy of the integrated plates is further utilized for connecting to the terminal connection member, thus contributing to size reduction of the battery.

In any one of the above battery manufacturing method, preferably, a slit is formed on the coinciding one of the positive current collecting parts and the negative current collecting parts, and the part located farther than the slit seen from the storage part. This configuration can restrain distortion of the current collecting part caused by formation of the raised part to the slightest level.

In the battery manufacturing method having an aspect of forming a slit in the current collecting part, preferably, the integrated plate used in the piling step has the slit in any one of a bent line, a curved line, and an oblique line extending from an edge portion located apart from the storage part toward the storage part. This configuration achieves formation of the raised part in a portion farther than the slit seen from the storage part only by bending or curving. In this case, the raised part may be formed concurrently with bonding of the positive electrode and the negative electrode.

A battery according to another embodiment of the present disclosure comprises an electrode laminated body encased in an outer casing, the electrode laminated body being formed by piling a positive electrode plate, a negative electrode plate, and a separator, wherein the electrode laminated body is formed by piling the card-like positive electrode plate, the card-like negative electrode plate, and the separator interposed therebetween and the electrode laminated body comprises the electricity storage part including the positive electrode plate, the negative electrode plate, and the separator, the positive current collecting part including the positive electrode plate only, and the negative current collecting part including the negative electrode plate only, at least any one of the positive electrode plate of the positive current collecting part and the negative electrode plate of the negative current collecting part is formed with an raised part raised from other parts by partly bending or curving, a plurality of the raised parts are overlapped one another seen from upper position, and overlapped portions of the raised parts are connected with a terminal connection member connected to an external terminal.

In the above battery, accuracy in alignment of the positive electrode plate and the negative electrode plate in the electrode laminated body is high. Further, the connection structure of the terminal connection member is made compact.

Effects of the Disclosure

According to the present configuration, a battery in which electrode plates are assuredly aligned in an electrode laminated body and a manufacturing method thereof are provided.

DETAILED DESCRIPTION OF THE EXEMPLARY EMBODIMENTS

Figure 1:
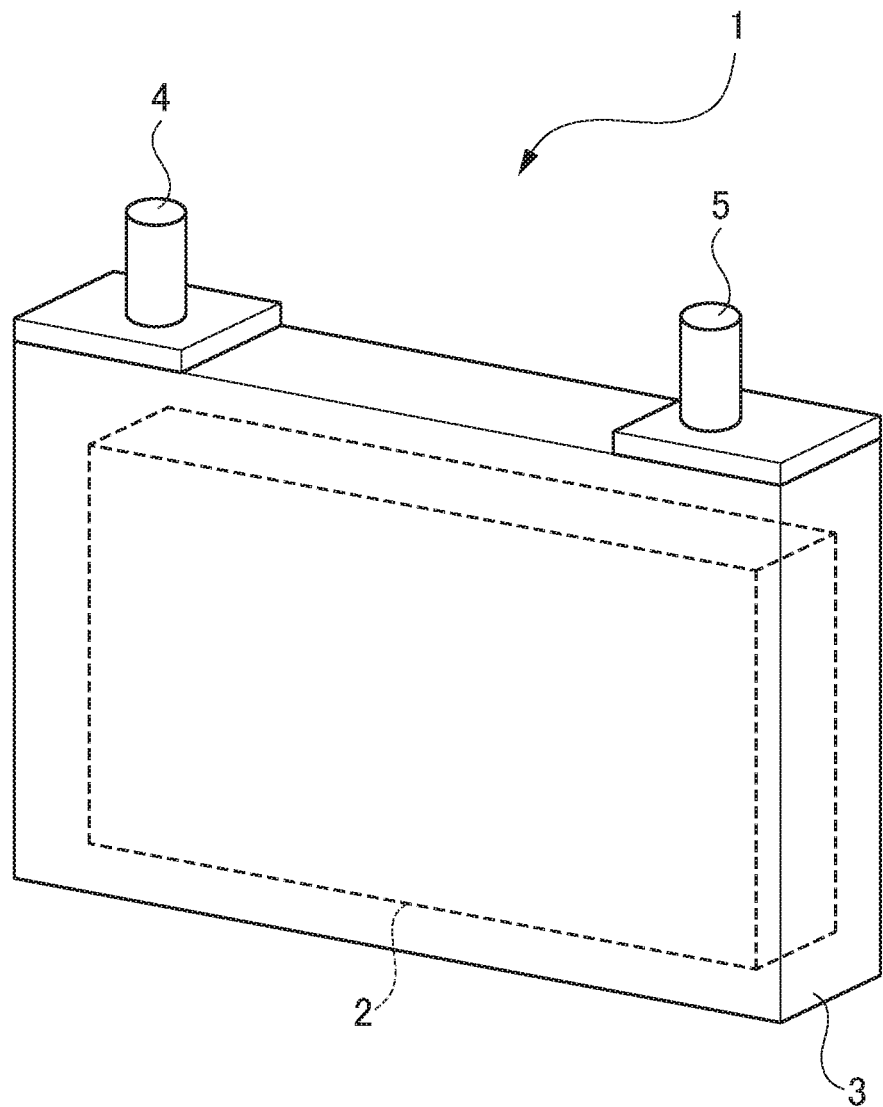
FIG. 1 is an external view of a battery in the present embodiment.

A present embodiment embodying the present disclosure is now explained referring to the accompanying drawings. The present embodiment embodies the present disclosure with a battery 1 shown in FIG. 1 and a manufacturing method thereof. The battery 1 in FIG. 1 is configured with an electrode laminated body 2 encased in an outer casing 3. The battery 1 is provided with a positive external terminal 4 and a negative external terminal 5. Technical features of the present disclosure described in the present embodiment reside in the electrode laminated body 2, and thus, the electrode laminated body 2 is explained in detail below.

Figure 2:
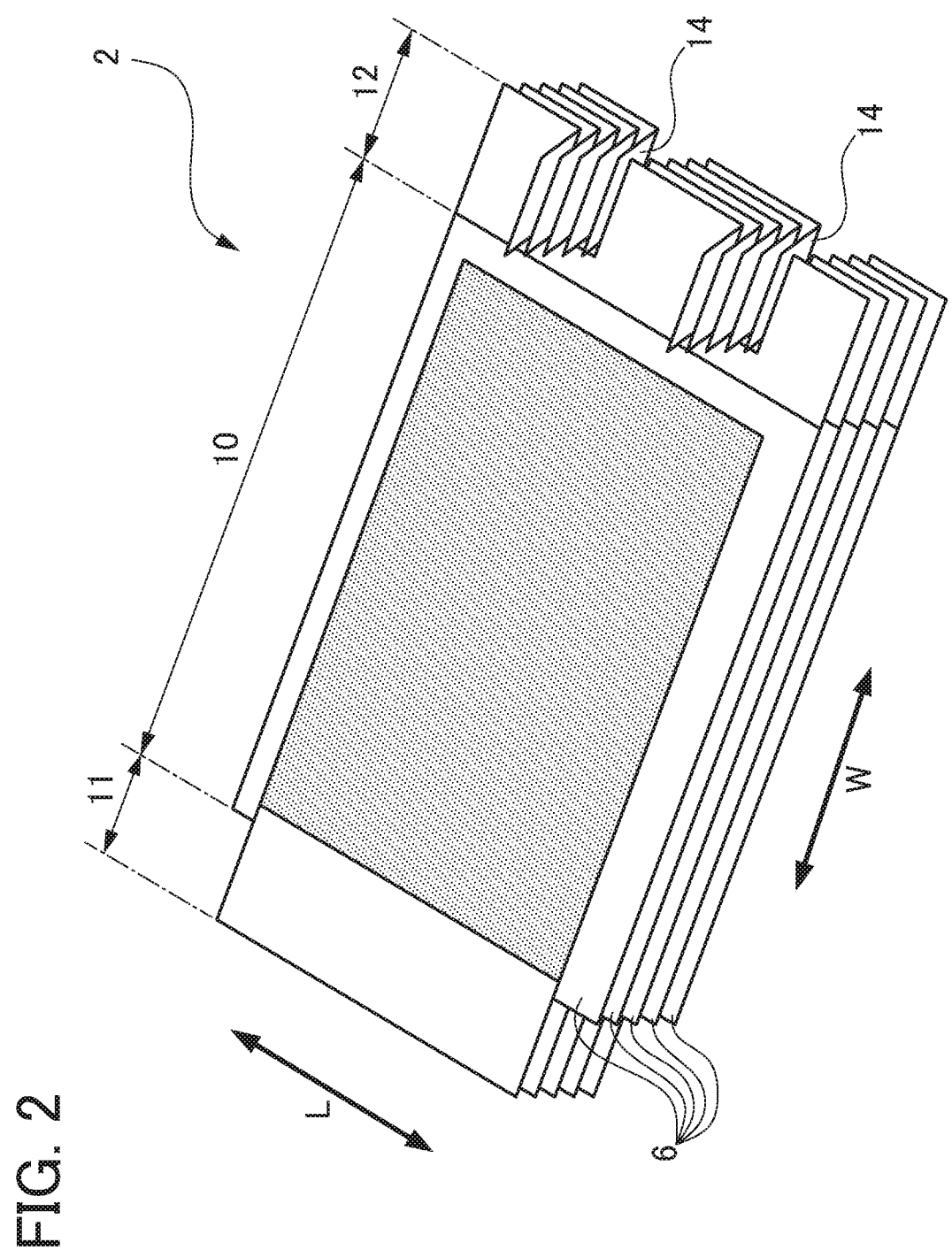
FIG. 2 is a perspective view of an electrode laminated body in the present embodiment.
Figure 3:
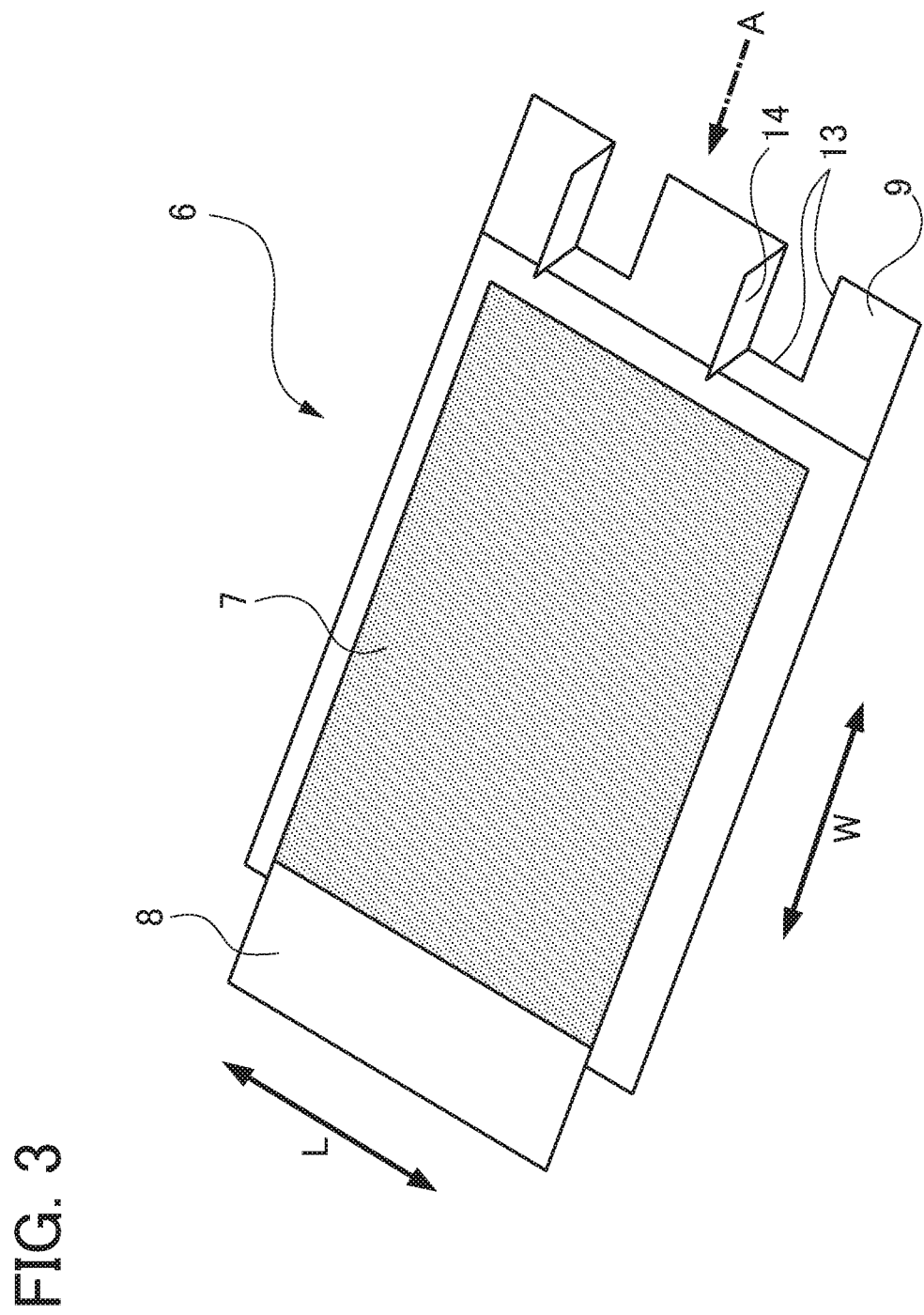
FIG. 3 is a perspective view of an integrated plate constituting the electrode laminated body in the present embodiment.

The electrode laminated body 2 of the battery 1 in the present embodiment s shown in FIG. 2. The electrode laminated body 2 shown in FIG. 2 is formed by flat piling a number of integrated plates 6. FIG. 3 shows a single integrated plate 6 configuring the electrode laminated body 2. The integrated plate 6 is in an almost rectangular card-like shape. The integrated plate 6 is formed by integrating a positive electrode plate, a negative electrode plate, and two layers of separators into a card-like shape in advance as mentioned below. The integrated plate 6 includes a storage part 7, a positive current collecting part 8, and a negative current collecting part 9. The storage part 7 includes all the positive electrode, the negative electrode, and the two separators. The positive current collecting part 8 includes the positive electrode plate only. The negative current collecting part 9 includes the negative electrode plate only.

In the electrode laminated body 2 in FIG. 2, naturally, the storage parts 7, the positive current collecting parts 8, and the negative current collecting parts 9 of the integrated plates 6 are overlapped together seen from upper position, respectively. Otherwise the respective parts look overlapped in view of the direction vertical to the integrated plates 6. Those respective overlapped portions in the electrode laminated body 2 are referred to as a storage part 10, a positive current collecting part 11, and a negative current collecting part 12 in the following explanation. In the battery 1 shown in FIG. 1, the positive current collecting part 11 and the negative current collecting part 12 are connected to the positive external terminal 4 and the negative external terminal 5, respectively.

The integrated plate 6 in FIG. 3 is explained in more detail. The integrated plate 6 of the present embodiment has slits 13 in the negative current collecting part 9, and raised parts 14 are formed in parts of the negative current collecting part 9. The slits 13 extend from an edge located apart from the storage part 7 toward the storage part 7 in a bent line shape. The slits 13 however do not enter the storage part 7.

In the negative current collecting part 9, parts located farther than the slits 13 when seen from the storage part 7 are bent and raised upward in FIG. 3 to form the raised parts 14. The slits 13 and the raised parts 14 are provided in the coinciding positions in any integrated plates 6 relative to a direction L in FIG. 3.

Figure 4:
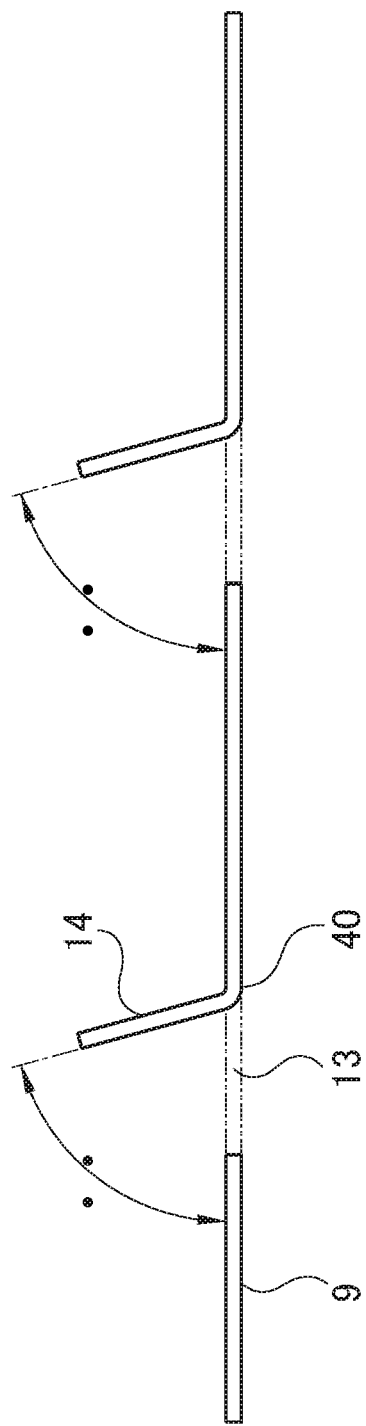
FIG. 4 is a front view of a negative current collecting part and raised parts.

FIG. 4 is a front view of the negative current collecting part 9 and the raised parts 14 when seen from an eye level indicated with an arrow A in FIG. 3. Each of the raised parts 14 is raised from a folding point 40, and its raised angle θ may be within a range of 5° to 85°. When the raised angle θ is too small, folding is meaningless. When the raised angle θ is nearly a right angle or exceeds the right angle, the raised part 14 itself obstructs overlapping of the raised parts 14. Specifically, in the electrode laminated body 2, the raised parts 14 of the respective integrated plates 6 are also overlapped seen from upper position as shown in FIG. 2.

The electrode laminated body 2 shown in FIG. 2 has high accuracy in alignment of the integrated plates 6. This accurate alignment is achieved by providing the raised parts 14 in the respective integrated plates 6. An alignment accuracy in a direction W in FIG. 2 is firstly explained. In the electrode laminated body 2, each end portion of the integrated plates 6 on a side of the negative current collecting part 12 is pushed against an appropriate alignment target, and thus the integrated plates 6 are easily aligned in the direction W. One example of the appropriate alignment target is a wall-like body as illustrated with a reference sign "36" in FIG. 3 of the above-mentioned Patent Document 1.

The negative current collecting part 12 is a part of the integrated plates 6 in which the positive electrode plates do not exist but only the negative electrode plates exist. Accordingly, the negative current collecting part 12 is more fragile than the storage part 10 where both the positive electrode plates and the negative electrode plates exist. However, in the present embodiment, the above-mentioned raised parts 14 are provided, and thus the rigidity of the negative current collecting part 12 against a compression load in the direction W is rather high. Thus, creases and deformation of the negative current collecting parts 9 in the respective integrated plates 6 are prevented even when the negative current collecting part 12 is pressed against the alignment target. Therefore, the high alignment accuracy relative to the direction W can be achieved.

Figure 5:
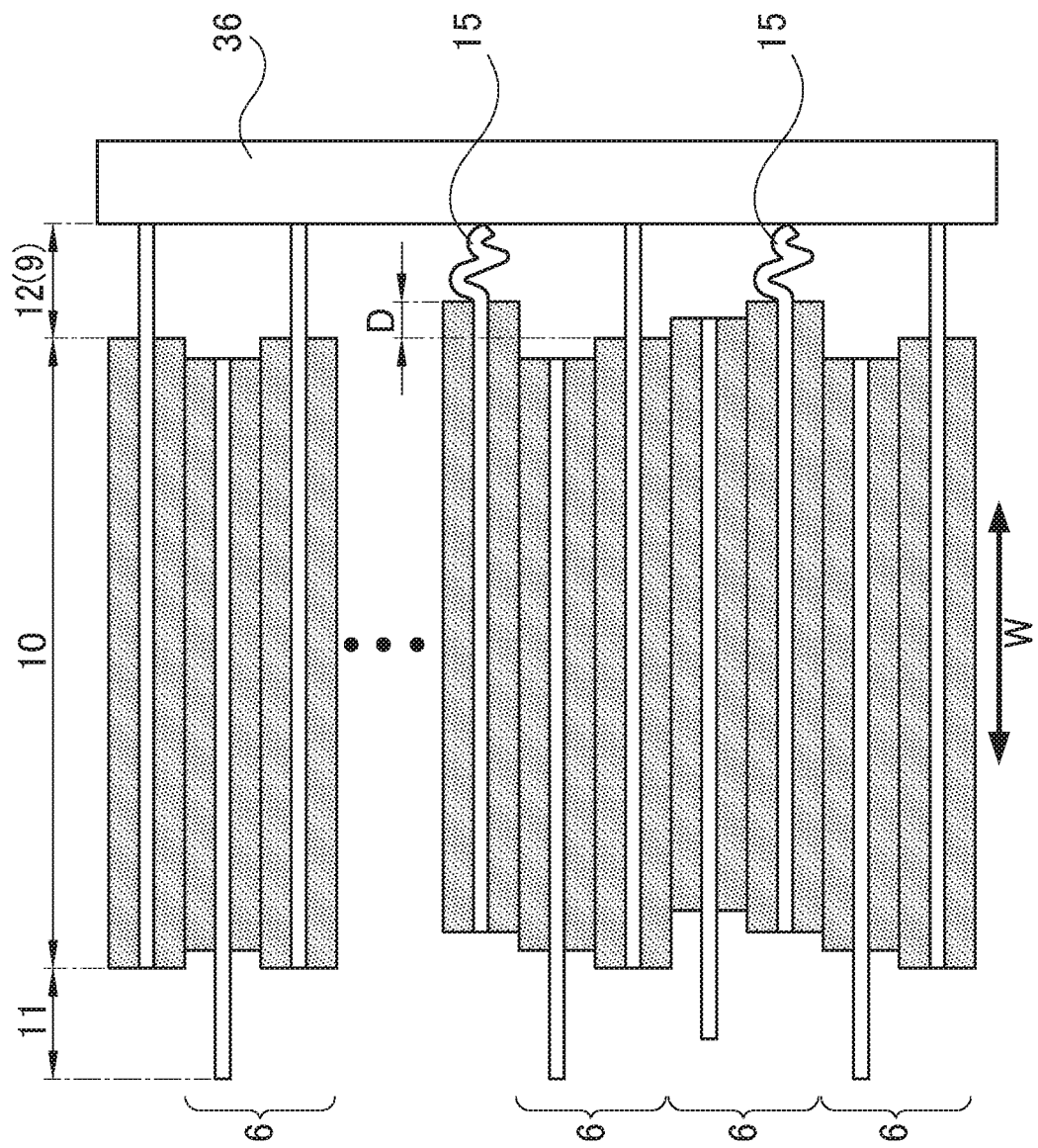
FIG. 5 is a side-sectional view illustrating a case of failure occurring in alignment due to creases in current collecting parts in a comparative example.

Alignment without providing the raised parts 14 could cause creased deformation 15 in a part of the negative current collecting part 9 as shown in FIG. 5. There is a deviation D in the storage part 10 in the direction W between the integrated plates 6 with the creased deviation 15 and the integrated plates 6 with no creased deviation 15. Thus, the alignment accuracy in the direction W is low. The present embodiment provides the raised parts 14 to prevent degradation in the alignment caused by the creased deformation 15.

In the above-mentioned electrode laminated body 2 of the present embodiment, the raised parts 14 contribute to size reduction of the electrode laminated body 2 in the direction W in FIG. 2 as well as contributing to the above-mentioned alignment accuracy. This is because the respective negative current collecting parts 9 may have shorter width in the direction W as compared to the electrode laminated body 2 having no raised parts 14. One specific example is herein assumed with the condition that the negative current collecting part 9 has a width of 15 mm and the alignment accuracy has an allowance of ±2 mm in a case of no raised parts 14 being provided. In this example, if the raised part 14 is arranged with a width of 12 mm, a length of 5 mm, and a raised angle θ of 45°, the alignment accuracy is improved to about ±0.5 mm. This leads to reduction in the width of the negative current collecting part 9 by 1.5 mm when the raised part 14 is formed.

For alignment in a direction L in FIG. 2, alignment has been made by pushing an edge of the storage part 10 in the direction L against an appropriate alignment target. The storage part 10 includes both the positive electrode plates and the negative electrode plates and thus has fairly large strength, having no possibility of creased deformation. Further in the embodiment, the raised parts 14 are overlapped one another seen from upper position in the negative current collecting part 12, and this configuration also contributes to the alignment in the direction L. This is because the raised parts 14 are provided in the coinciding location in any integrated plates 6 as mentioned above.

Figure 6:
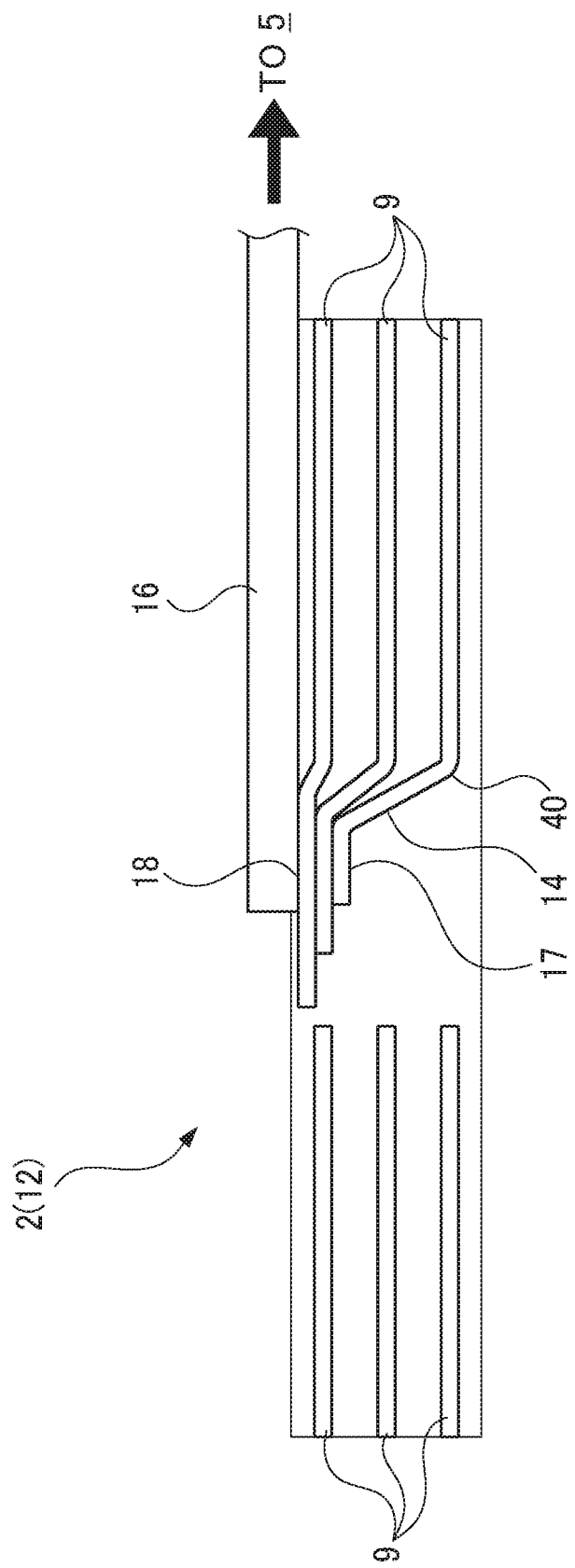
FIG. 6 is a front view showing the electrode laminated body connected with a negative terminal connection member.

The raised parts 14 in the electrode laminated body 2 shown in FIG. 2 also has a role of connection with the negative external terminal 5 shown in FIG. 1. A connection structure is now explained. FIG. 6 shows a state in which a negative terminal connection member 16 is connected to the electrode laminated body 2. FIG. 6 is a front view of the electrode laminated body 2 that is connected with the negative terminal connection member 16 seen from a side of the negative current collecting part 12 (the eye level is same as the direction indicated with the arrow A in FIG. 3). The negative terminal connection member 16 is connected to a part of the negative current collecting part 12 in the electrode laminated body 2. To be more specific, the negative terminal connection member 16 is connected to a portion of the raised part 14 in each of the negative current collecting part 9.

As shown in FIG. 6, a leading end portion of the raised part 14 of the respective negative current collecting parts 9 is provided with a flat portion 17. The flat portion 17 is in parallel with portions other than the raised parts 14 of the negative current collecting parts 9. In FIG. 6, a plurality of the flat portions 17 are laminated, and a bonding point 18 where the negative current collecting parts 9 and the negative terminal connection member 16 are bonded together is provided on that overlapped portion. In the bonding point 18, the flat portions 17 and the negative terminal connection member 16 are welded. Thus, the negative terminal connection member 16 is connected with the negative current collecting part 12 of the electrode laminated body 2. A welding method may be any one of resistance welding, laser welding, ultrasonic welding, and others. This bonding step is performed after a step of piling the integrated plates 6. The other end portion of the negative terminal connection member 16 which is not appeared in FIG. 6 is connected to the negative external terminal 5.

Figure 7:
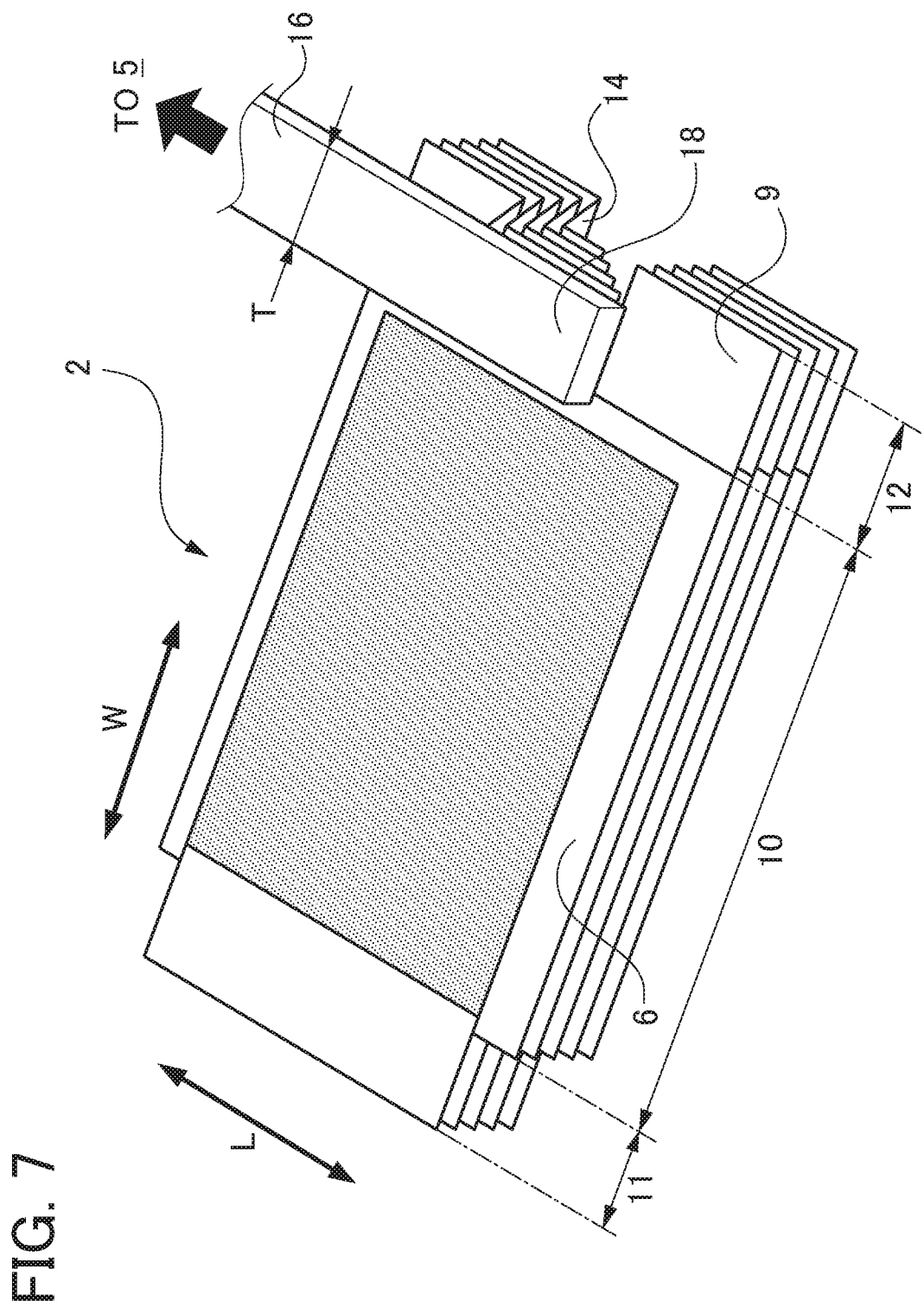
FIG. 7 is a perspective view showing the electrode laminated body connected with the negative terminal connection member.

FIG. 7 is a perspective view of the electrode laminated body 2 after the negative terminal connection member 16 is connected. As shown in FIG. 7, the negative terminal connection member 16 extends in parallel with an edge of the negative current collecting part 12 from the boding point 18. On a leading end, the negative terminal connection member 16 is connected to the negative external terminal 5 on an inner part of the outer casing 3. In FIG. 7, the negative terminal connection member 16 is depicted as if the member 16 is slightly lifted upward from the electrode laminated body 2. This depiction has been made only for prioritizing intuitive understandability of the configuration. Actually, the negative terminal connection member 16 is positioned at an almost same height with the electrode laminated body 2 as shown in FIG. 6 while the arrangement depicted in FIG. 7 may also be adopted.

As mentioned above, the negative terminal connection member 16 is connected to a part of the raised part 14 of the negative current collecting part 9 in the present embodiment. This configuration also contributes to size-reduction of the battery 1 since the negative current collecting part 9 has no need to provide any special parts for connecting the negative terminal connection member 16. Further, the above-mentioned shortening of the width in the direction W of the negative current collecting part 9 leads to shortening of a width T of the negative terminal connection member 16. In the battery 1 shown in FIG. 1, naturally, the positive electrode side also adopts a terminal connection member for connecting the positive current collecting part 11 and the positive external terminal 4. A connection method may be the similar one with the negative electrode side as shown in FIGS. 6 and 7 or any other known connection methods.

Next, a manufacturing method of the battery 1 shown in FIG. 1 is explained. The battery 1 is basically manufactured by firstly manufacturing the electrode laminated body 2 and then accommodating the manufactured electrode laminated body 2 into the outer casing 3. In the method, accommodation of the electrode laminated body 2 into the outer casing 3 is not the technical feature of the present disclosure, and thus has no differences from the known technique. The technical feature of the present disclosure as for the manufacturing method resides in a process of manufacturing the electrode laminated body 2. To be specific, in manufacturing the electrode laminated body 2, a negative electrode plate which is formed with the above-mentioned slits 13 and the raised parts 14 is used. This is the technical feature of the present disclosure.

Figure 8:
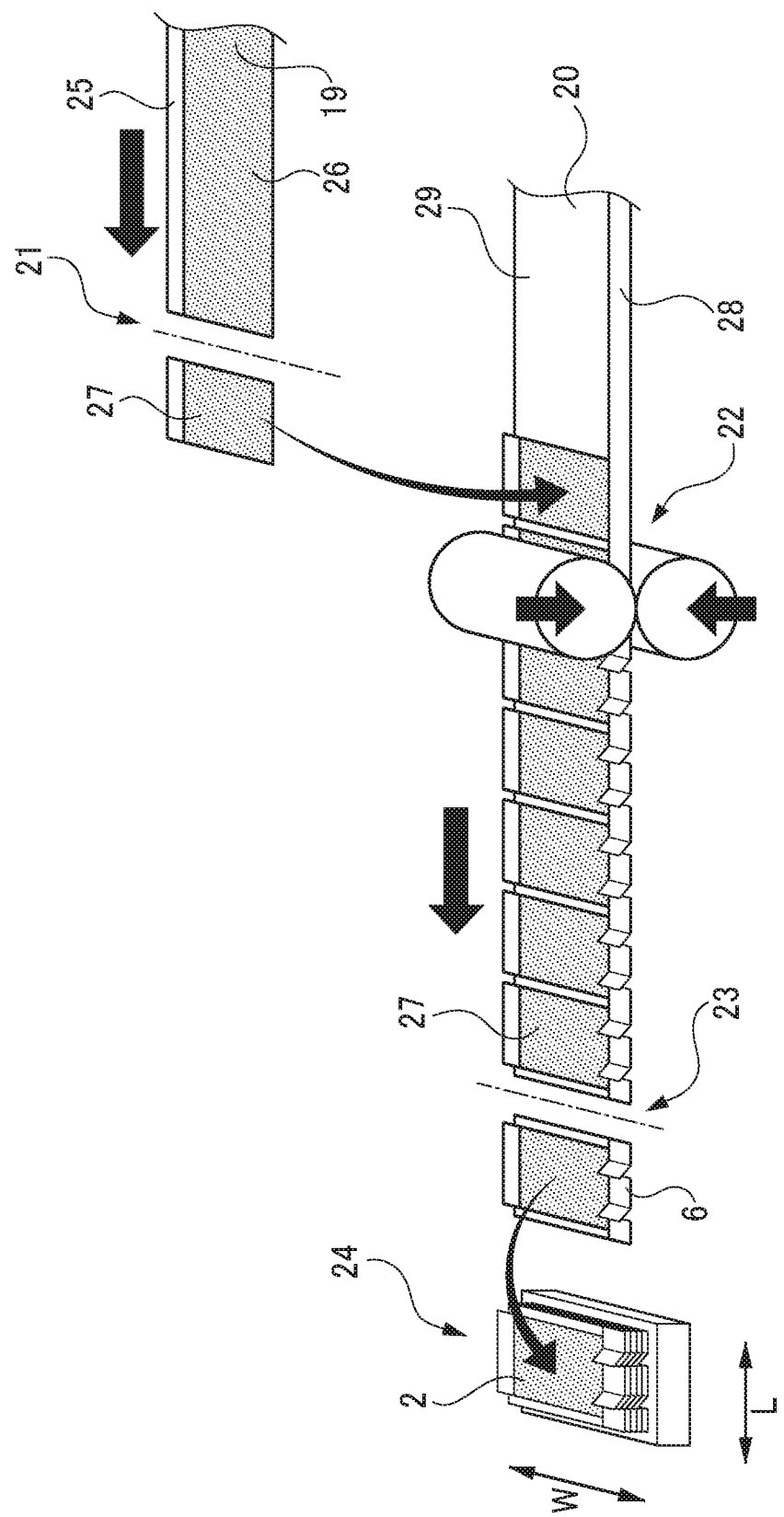
FIG. 8 is a schematic diagram for explaining a manufacturing method of the electrode laminated body in the present embodiment.

The manufacturing process of the electrode laminated body 2 is explained with reference to FIG. 8. FIG. 8 illustrates a process of obtaining the electrode laminated body 2 from a positive electrode strip 19 and a negative electrode strip 20. In FIG. 8, as equipment for carrying out this process, there are provided a first cutting unit 21, a joint unit 22, a second cutting unit 23, and a piling unit 24.

The positive electrode strip 19 is a long-strip shaped one formed by a current collecting foil coated on its both faces with electrode active material layers. The positive electrode strip 19 is provided on its one end parallel to its longitudinal direction with an uncoated portion 25 including only a current collecting foil and provided on other portions with a coated portion 26 including the electrode active material layers. The positive electrode strip 19 is cut in a direction orthogonal to the longitudinal direction in the first cutting unit 21, so that card-like positive electrode plates 27 are obtained.

The negative electrode strip 20 is similar to the positive electrode strip 19 in a way that the strip is long-strip shaped and formed with a current collecting foil coated on its faces with electrode active material layers. However, materials for the current collecting foils and the electrode active material layers are different in the positive strip and the negative strip. The negative electrode strip 20 is similarly provided on its one end parallel to its longitudinal direction with an uncoated portion 28 including only the current collecting foil and provided on the remaining portion with a coated portion 29 including the electrode active material layers. The positive electrode strip 19 and the negative electrode strip 20 are disposed such that the uncoated portion 25 and the uncoated portion 28 are placed opposite to each other. Further, the coated portion 29 of the negative electrode strip 20 is covered with separators on both faces. The uncoated portion 25 is not covered with the separator. Namely, the above-mentioned negative current collecting part 12 is a portion having no positive electrode plate and no negative active material layer but only including the negative current collecting foil.

In the joint unit 22, the negative electrode strip 20 and the positive electrode plates 27 are bonded together. The negative electrode strip 20 and the positive electrode plates 27 are bonded such that the coated portions 26 and the coated portion 29 are laminated each other. Accordingly, after bonding, the uncoated portions 25 of the positive electrode plates 27 and the uncoated portion 28 of the negative electrode strip 20 protrude in opposite directions from the overlapped part of the coated portions 26 and the coated portion 29. After bonding, the card-like positive electrode plates 27 are in a state being arranged on the long-strip shaped negative electrode strip 20.

Subsequently, in the second cutting unit 23, the negative electrode strip 20 after bonding is cut. A cutting direction is a direction orthogonal to the longitudinal direction, and the cut point is a space between the adjacent positive electrode plates 27. As a result of this, the integrated plate 6 is obtained. The integrated plate 6 is formed by integrating the positive electrode plate 27, the negative electrode plate, and the separators into a card-like shape and includes the storage part 7 in which all the positive electrode plate 27, the negative electrode plate, and the separators exist, the positive current collecting part 8 including only the positive electrode plate 27, and the negative current collecting part 9 including only the negative electrode plate. A plurality of the integrated plates 6 are piled in the piling unit 24 to produce the electrode laminated body 2. In the piling unit 24, the integrated plates 6 are piled such that the storage parts 7, the positive current collecting parts 8, and the negative current collecting parts 9 are each overlapped seen from upper position.

Figure 9:
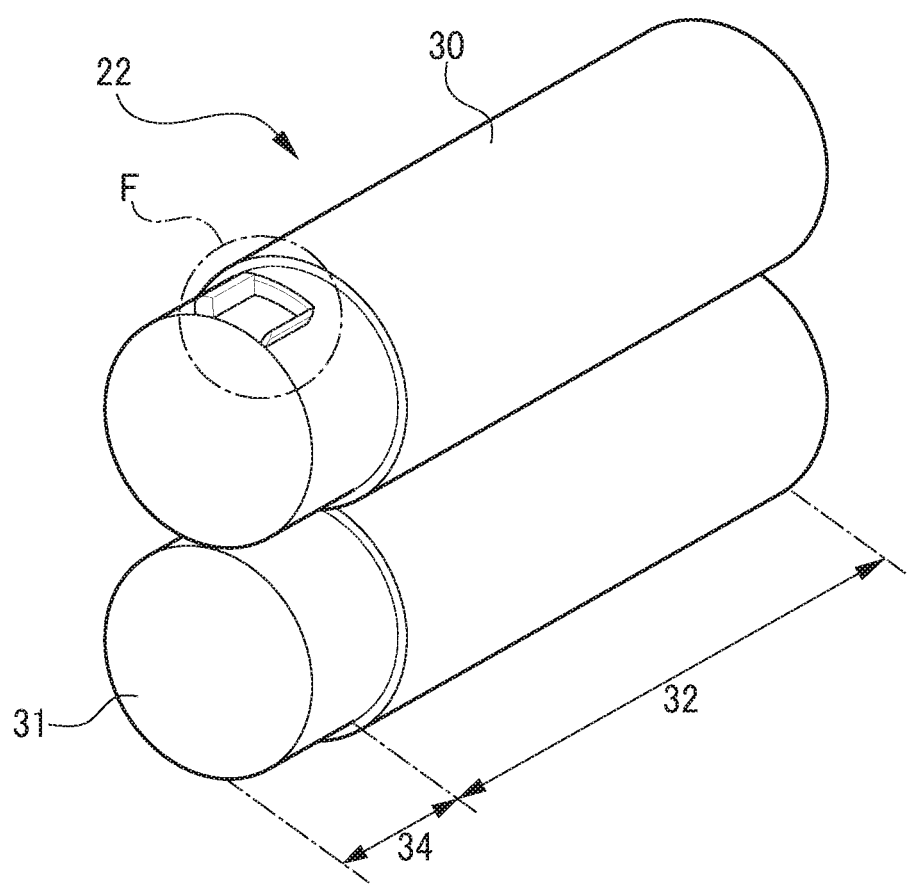
FIG. 9 is a perspective view of a joint unit.

When the negative electrode strip 20 and the positive electrode plates 27 are bonded in the joint unit 22, formation of the raised parts 14 is also carried out. The joint unit 22 is configured with a pair of rollers of a first roller 30 and a second roller as shown in FIG. 9. The pair of rollers in FIG. 9 includes a bonding section 32 and a folding section 34. The bonding section 32 is a section where the coated portion 26 and the coated portion 29 pass through. Both the first roller 30 and the second roller 31 in the bonding section 32 are of simple columnar shape.

The folding section 34 is a section where the uncoated portion 28 of the negative electrode strip 20 passes through. When the uncoated portion 28 passes through the folding section 34, the slits 13 and the raised parts 14 are formed. Thus, the first roller 30 and the second roller 31 in the folding section 34 are formed to be in a distinctive shape, unlike a simple columnar shape.

Figure 10:
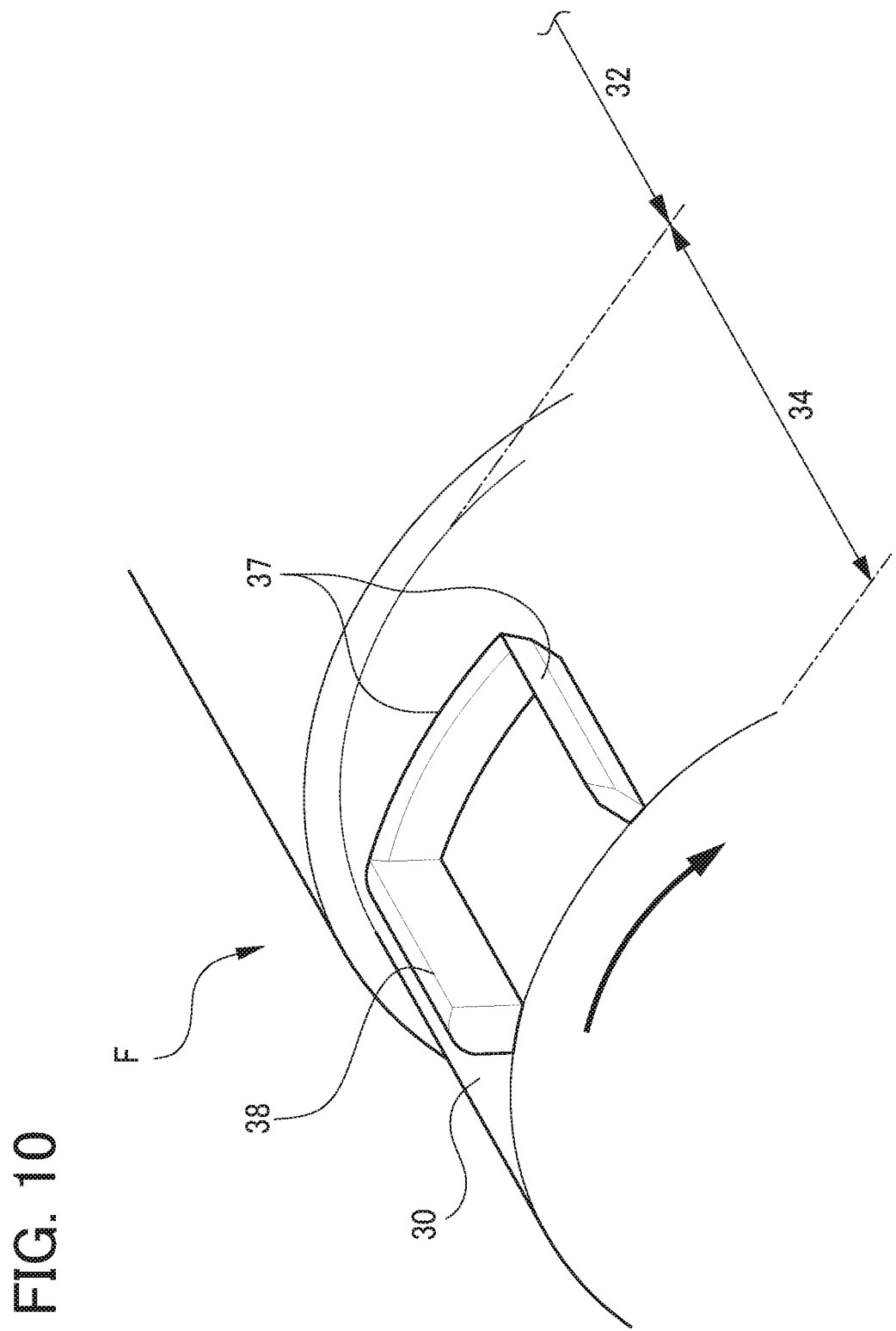
FIG. 10 is a perspective view of a surface of a first roller in a folding section.

FIG. 10 shows a surface configuration of the first roller 30 in the folding section 34. As shown in FIG. 10, in the folding section 34, a cutting blade 37 and a folding protrusion 38 are formed in the folding section 34. Remaining portion other than the cutting blade 37 and the folding protrusion 38 is in a simple columnar shape. The cutting blade 37 is formed to make the slit 13 in the uncoated portion 28. Accordingly, the cutting blade 37 is formed in a shape of a bent line extending from an edge apart from the bonding section 32 toward the bonding section 32 in the folding section 34. However, the cutting blade 37 does not enter the bonding section 32. Further, the folding protrusion 38 is formed linearly extending from the most inner portion of the cutting blade 37 to an end portion opposite to the bonding section 32.

Figure 11:
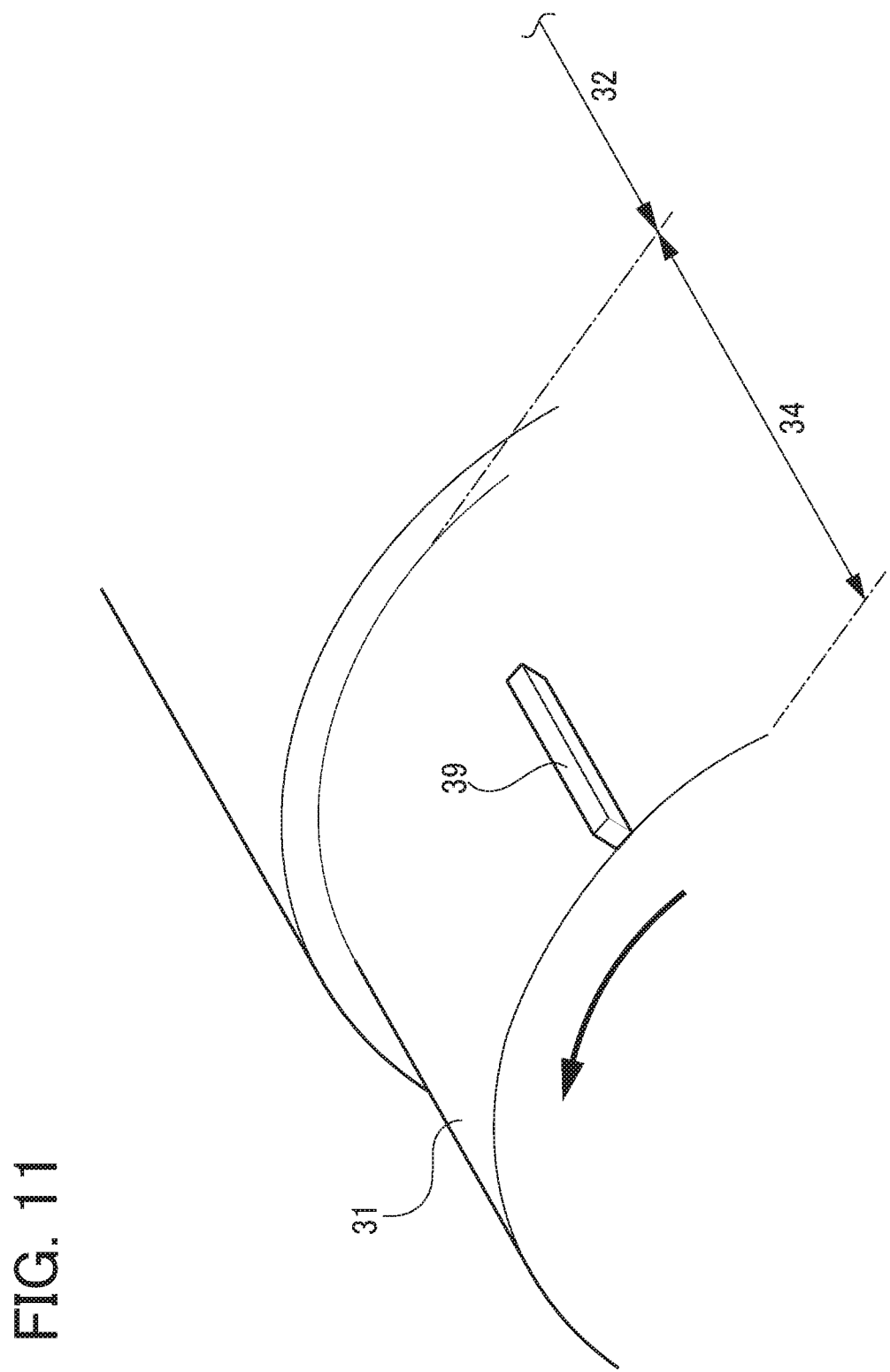
FIG. 11 is a perspective view of a surface of a second roller in the folding section.

The second roller 31 in the folding section 34 is provided with a folding pad 39 as shown in FIG. 11. The folding pad 39 is linearly formed in the folding section 34 extending from an edge apart from the bonding section 32 by the same distance with the above-mentioned folding protrusion 38. Material for the folding pad 39 is something softer than the folding protrusion 38, such as rubber. The folding pad 39 is provided in a position at which the pad 39 certainly comes to contact with the folding protrusion 38 when the first roller 30 and the second roller 31 are rotated.

Figure 12:
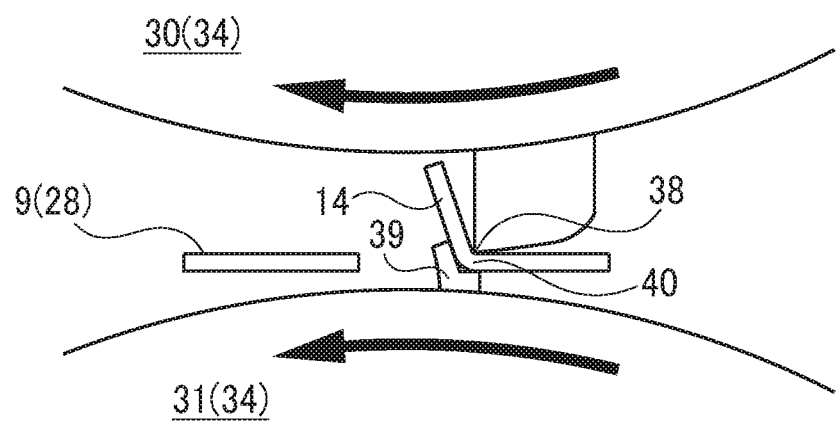
FIG. 12 is a sectional view for explaining formation of the raised part in the folding section.

Accordingly, when the negative electrode strip 20 and the positive electrode plates 27 pass through the joint unit 22, a slit 13 is formed in the uncoated portion 28 by the cutting blade 37, then a part of the uncoated portion 28 is held between the folding protrusion 38 and the folding pad 39 as shown in FIG. 12. The thus held portion of the uncoated portion 28 is bent to be a folded part 40. This folded part 40 is formed at a linear portion extending from the most inner part of the slit 13 to the end of the uncoated portion 28. A leading portion located distal from the folded part 40 is raised to become the raised part 14. This raised part 14 is a part of the uncoated portion 28 located farther than the slit 13 when seen from the coated portion 29.

The folding pad 39 in FIG. 12 is pressed by the folding protrusion 38 and thus got deformed from its original shape. This deformation amount of the folding pad 39 is determined to adjust a raised angle θ indicated in FIG. 4. Specifically, when the deformation amount of the folding pad 39 in folding is set to be large, the raised part 14 at the large raised angle θ is obtained. On the other hand, when the deformation amount of the folding pad 39 in folding is set to be small, the raised part 14 at the small raised angle θ is obtained. In this manner, the raised angle θ may be set within a preferable range.

A circumferential length of the first roller 30 and the second roller 31 is same as an arrangement period of the integrated plates 6 on the negative electrode strip 20 in the direction L on a downstream side of the joint unit 22 in FIG. 8. This arrangement achieves formation of the raised part 14 in the coinciding position in the respective integrated plates 6.

Figure 13:
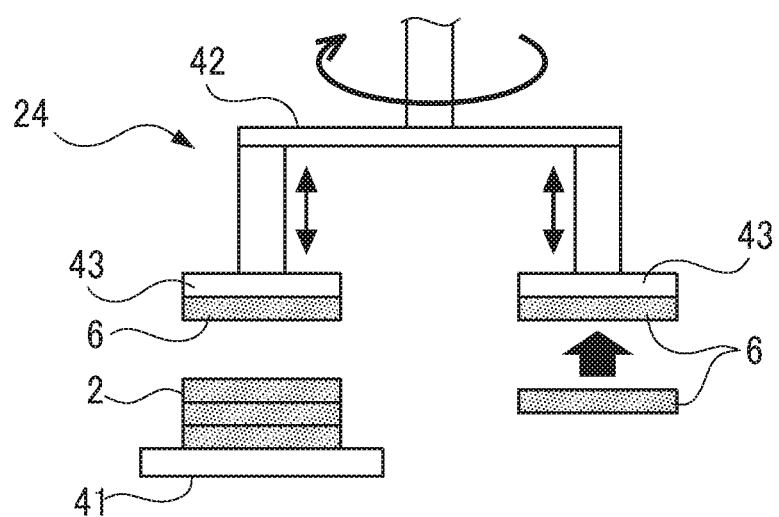
FIG. 13 is a schematic diagram showing a configuration of a piling unit.

One configuration of the piling unit 24 is shown in FIG. 13. The piling unit 24 is provided with a piling table 41 and a rotor 42. The rotor 42 is provided with two suction pads 43. The two suction pads 43 can be lifted, with respect to the rotor 42. Owing to this configuration, the integrated plates 6 can be piled on the piling table 41.

To be more specific, the integrated plate 6 having been cut in the second cutting unit 23 is sucked and lifted by one of the suction pads 43. The rotor 42 is then rotated by 180° and the integrated plate 6 is placed on the piling table 41. By repetition of this operation, the electrode laminated body 2 is formed on the piling table 41. The lifting function of the suction pads 43 is utilized for lifting and placement of the integrated plates 6. A moving direction of the integrated plates 6 placed on the piling table 41 is a vertical direction, and therefore, the integrated plates 6 are piled to make the raised parts 14 overlapped seen from upper position, so that the raised parts 14 do not obstruct the operation. Further, as mentioned above, the alignment of the integrated plates 6 can performed on the piling table 41 by use of the appropriate alignment target.

As mentioned above, the electrode laminated body 2 including the negative current collecting part 12 with considerably high rigidity owing to the raised parts 14 can be obtained. Subsequently, respective steps of attachment of the above-mentioned negative terminal connection member 16, attachment of the positive terminal connection member, and encasing in the outer casing 3 are carried out to obtain the battery 1 shown in FIG. 1. Attachment of the positive and negative terminal connection members and encasing in the outer casing 3 may be performed by the known technique. Further, in the outer casing 3, not only the electrode laminated body 2 but also a known electrolyte is encased.

Figure 14:
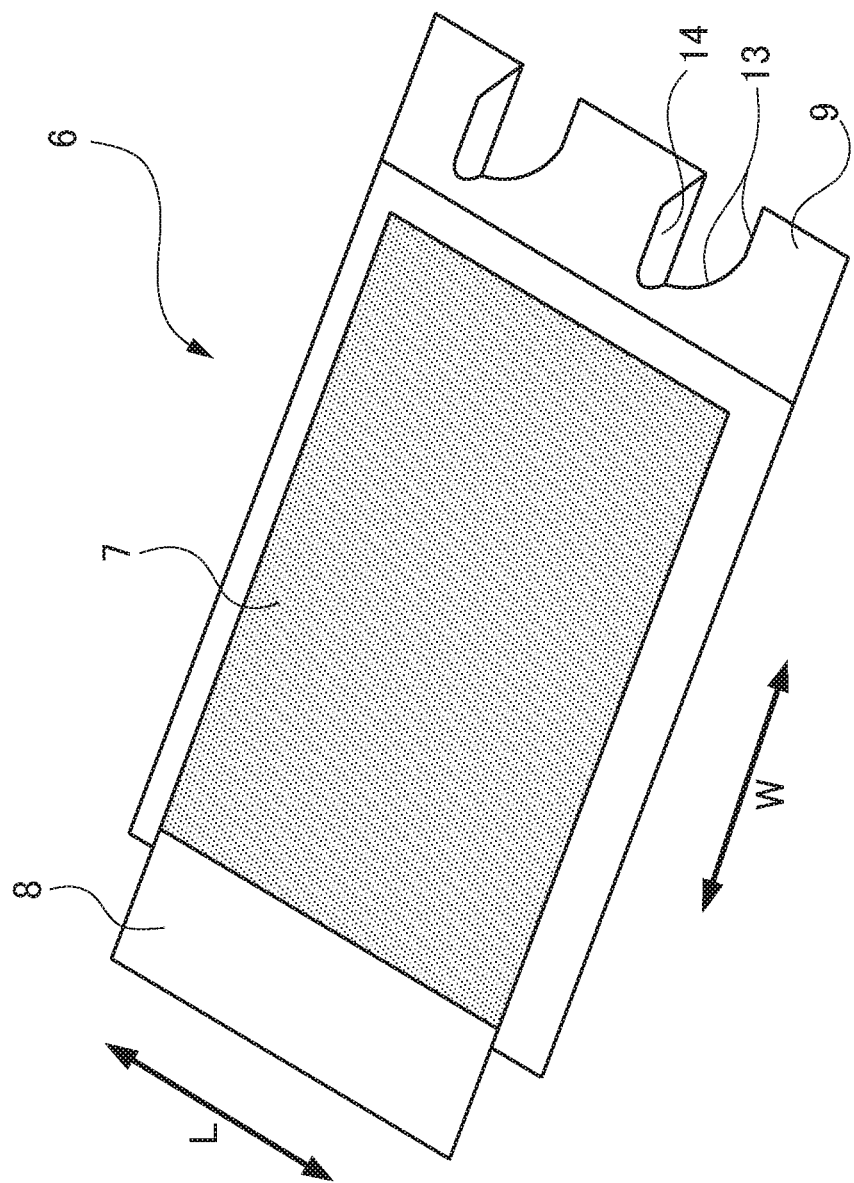
FIG. 14 is a perspective view of a slit for forming the raised part in a first modified example.
Figure 15:
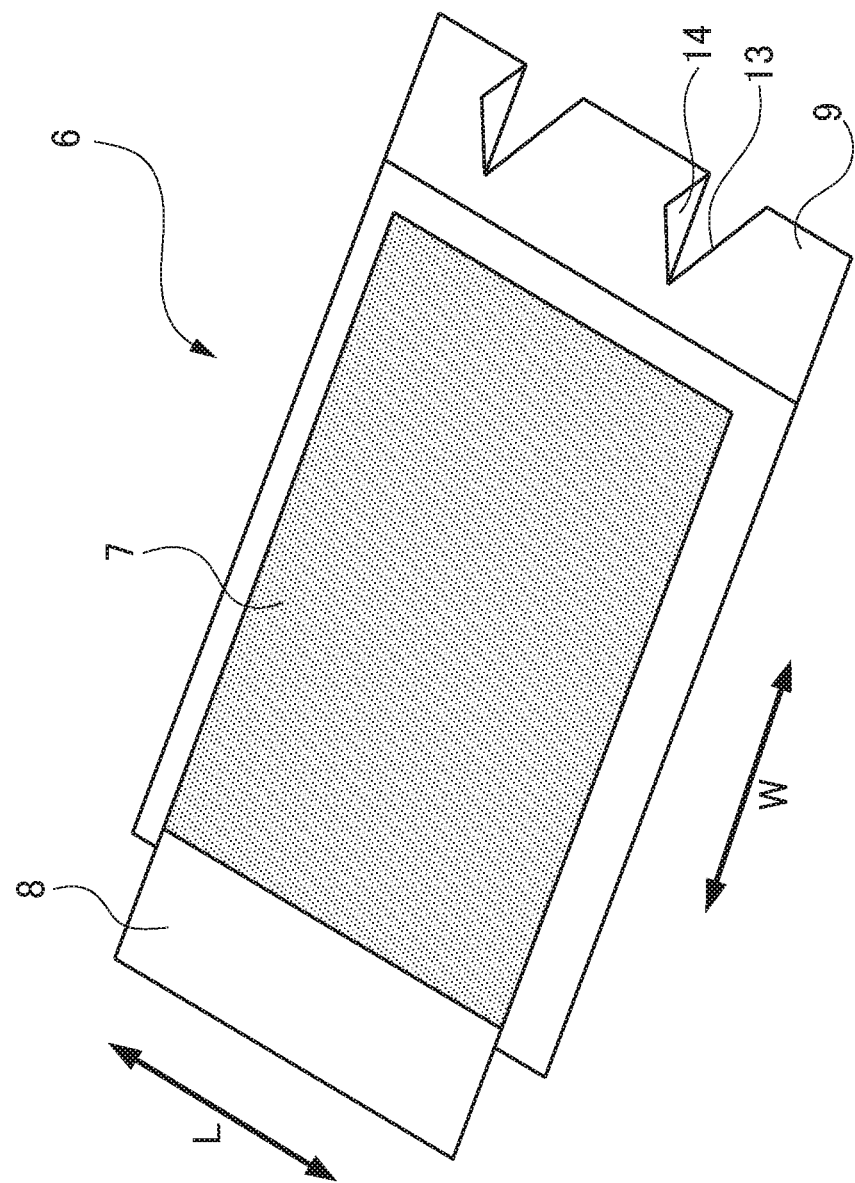
FIG. 15 is a perspective view of a slit for forming the raised part in a second modified example.

Modified examples of the present embodiment are now explained. The modified examples explained herein are related to modification in a specified shape of the raised part 14. In the above explanation, the shape of the slit 13 for forming the raised part 14 in the negative current collecting part 9 is in a bent line shape as shown in FIG. 3. The shape of the slit 13 is however not limited to this, and may be curvilinear as shown in FIG. 14 or may be oblique as shown in FIG. 15. In a case of being bent line, each angle in each section of the bent line may be any angle other than the one shown in the figure. Further, the shape of the raised part 14 may be a curve having no clear line of folded part 40. The raised angle θ in the example of the curved shape may be defined by an inclination angle of a planar portion located distal from the curved portion.

Figure 16:
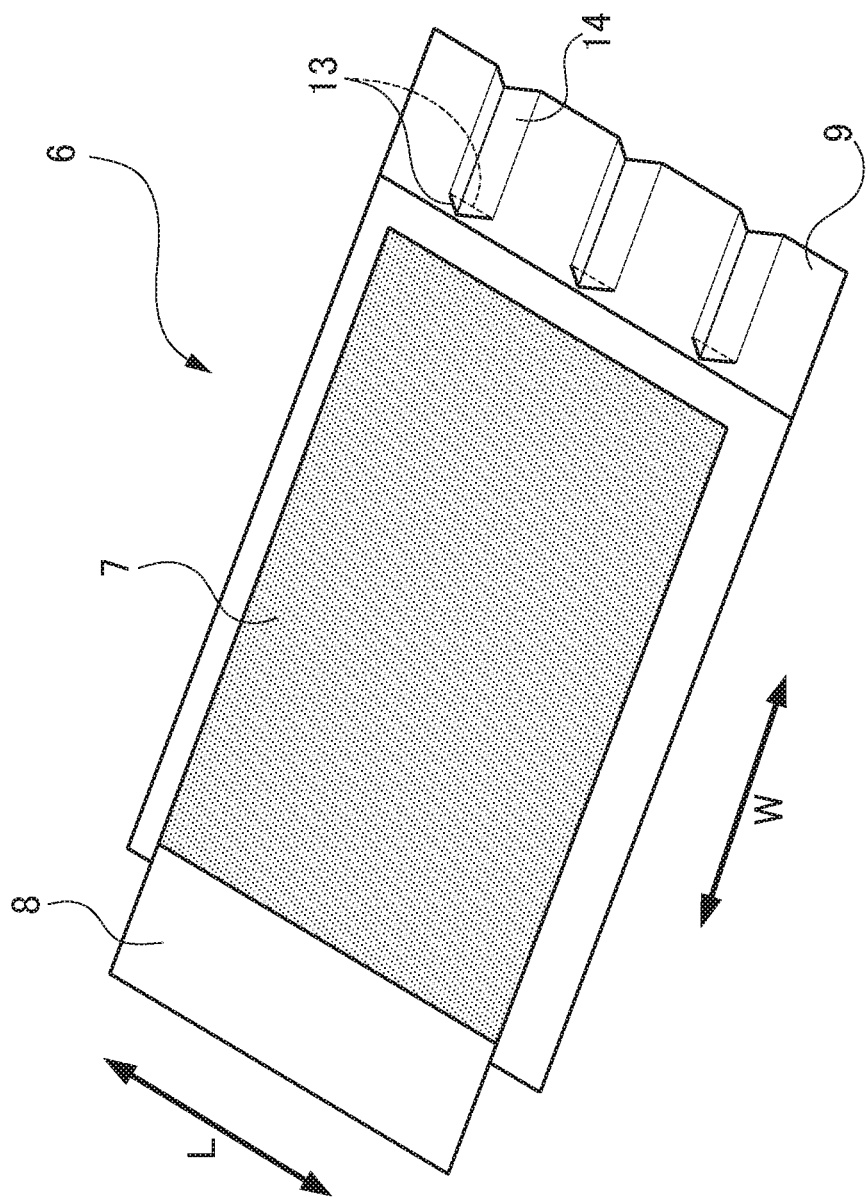
FIG. 16 is a perspective view of the raised part in a modified example.

Alternatively, as shown in FIG. 16, the shape of the slit 13 may be the one not reaching the edge of the negative current collecting part 9. In this case, the negative current collecting part 9 (the uncoated portion 28) needs to be performed with not only formation of the slit 13 but also a pressing step after that. This example however has the effect of improving the rigidity of the negative current collecting part 9. Another alternative is to omit the slit 13 in FIG. 16 and only perform the pressing process, but this example is rather disadvantageous since the negative current collecting part 9 tends to have distortion. In other words, the slit 13 helps to prevent distortion in the negative current collecting part 9 even if the raised part 14 is formed.

According to the above-mentioned present embodiment explained in detail, the rigidity of the current collecting part is improved by providing the raised part 14 in a part of the current collecting part (the uncoated portion) constituting the electrode laminated body 2. Accordingly, a manufacturing method of a battery that is excellent in alignment accuracy of aligning an electrode plate configuring an electrode laminated body 2 and a battery 1 manufactured by this manufacturing method are achieved. Further, the method and the battery contribute to size reduction of the electrode laminated body 2.

The present embodiment is only illustration and the present disclosure is not limited to the present embodiment. Accordingly, the present disclosure may be applied with various changes and modifications without departing from the scope of its subject matter. For example, in the above embodiment, the raised part 14 is provided in the negative current collecting part 9. Configuration is however not limited to this, and the raised part 14 may be provided in the positive current collecting part 8. In these cases, all the integrated plates 6 need to be provided with the raised parts 14 formed on the coinciding current collecting part of either one of the positive current collecting part or the negative current collecting part. Alternatively, the raised parts 14 may be provided both in the negative current collecting part 9 and in the positive current collecting part 8. In this case, all the integrated plates 6 need to be provided with the raised parts 14 formed on both of the positive and negative current collecting parts. Further, the number of the raised parts 14 provided in the single integrated plate 6 may be arbitrarily determined, but the number also needs to coincide in one electrode laminated body 2.

The present disclosure may be adopted for any type of batteries. Batteries only have to be the ones configured to include an electrode laminated body formed by piling positive electrode plates, negative electrode plates, and separators and encased in an outer casing. A lithium-ion battery, a nickel hydride battery, and a solid-state battery may be within a range of battery that can be adopted for the present disclosure. The positive electrode plate and the negative electrode plate are each configured with a current collecting foil coated on its surface with an electrode active material layer, but this is not essential. Depending on a type of a battery, the current collecting foil and the electrode active material layer may not be separated.

A manufacturing process may be different from the one shown in FIG. 8. As one alternative, the integrated plate 6 may be formed in a manner that the negative electrode strip is firstly cut into a card-like shape and then placed on the positive electrode strip, or in another manner that both the positive electrode plate and the negative electrode plate are cut into card-like shapes and bonded one by one. The rotor 42 in FIG. 13 may be replaced with the one of a linear-reciprocating-motion type.

REFERENCE SIGNS LIST

1 Battery
2 Electrode laminated body
3 Outer casing
4 Positive external terminal
5 Negative external terminal
6 Integrated plate
7,10 Storage part
8,11 Positive current collecting part
9,12 Negative current collecting part
13 Slit
14 Raised part
16 Negative terminal connection member
18 Bonding part
27 Positive electrode plate

What is claimed is:

1. A manufacturing method of a battery comprising an electrode laminated body encased in an outer casing, the electrode laminated body being formed by piling a positive electrode plate, a negative electrode plate, and a separator, the method comprising:
    an integrated plate manufacturing process of manufacturing an integrated plate configured with the positive electrode plate, the negative electrode plate, and the separator which are integrated in a card-like shape, the integrated plate comprising a storage part including the positive electrode plate, the negative electrode plate, and the separator, a positive current collecting part including the positive electrode plate only, and a negative current collecting part including the negative electrode plate only, and
    a piling process of manufacturing the electrode laminated body by piling a plurality of the integrated plates such that the storage parts, the positive current collecting parts, and the negative current collecting parts are overlapped together as seen from a top view of the battery, wherein
    the integrated plate manufacturing process includes a raising step of forming a raised part raised from an other part by partly bending or curving in at least a coinciding one of the positive current collecting part and the negative current collecting part for the integrated plate, and
    a plurality of the raised parts are overlapped with one another as seen from the top view of the battery in the piling process,
    wherein a slit is formed on the coinciding one of the positive current collecting part and the negative current collecting part, and the part located farther than the slit seen from the storage part.

2. The battery manufacturing method according to claim 1, wherein the method includes a terminal connection process of connecting a terminal connection member for connecting an external terminal to an overlapped portion of the raised parts after the piling step.

3. The battery manufacturing method according to claim 1, wherein the integrated plate used in the piling step has the slit in any one of a bent line, a curved line, and an oblique line extending from an edge portion located apart from the storage part toward the storage part.

4. A battery comprising an electrode laminated body encased in an outer casing, the electrode laminated body being formed by piling a positive electrode plate, a negative electrode plate, and a separator, wherein
    the electrode laminated body is formed by piling the card-like positive electrode plate, the card-like negative electrode plate, and the separator interposed therebetween and the electrode laminated body comprises the electricity storage part including the positive electrode plate, the negative electrode plate, and the separator, the positive current collecting part including the positive electrode plate only, and the negative current collecting part including the negative electrode plate only,
    at least any one of the positive electrode plate of the positive current collecting part and the negative electrode plate of the negative current collecting part is formed with an raised part raised from other parts by partly bending or curving,
    a plurality of the raised parts are overlapped with one another as seen from a top view of the battery, and
    overlapped portions of the raised parts are connected with a terminal connection member connected to an external terminal,
    wherein a slit is formed on the coinciding one of the positive current collecting part and the negative current collecting part, and the part located farther than the slit seen from the storage part.

* * * * *